United States Patent [19]
Albrecht et al.

[11] Patent Number: 5,742,407
[45] Date of Patent: Apr. 21, 1998

[54] ARRANGEMENT FOR SUPPORTING A DRAWER IN A DRAWER FEED SCANNER

[75] Inventors: Thomas S. Albrecht, Canandaigua; Eric P. Hochreiter, Bergen; Dale W. Ryan, Rochester; Martin L. Slade, Spencerport, all of N.Y.

[73] Assignee: Eastman Kodak Company, Rochester, N.Y.

[21] Appl. No.: 619,025

[22] Filed: Mar. 20, 1996

[51] Int. Cl.$^6$ .................... H04N 1/04; G03G 15/04; G03B 27/62; H01L 27/00
[52] U.S. Cl. .................... 358/496; 358/474; 399/213; 355/75; 250/208.1; 250/239; 364/708.1
[58] Field of Search .................... 358/496, 474, 358/494, 400, 497, 498, 487; 364/708.1, 709.01, 705.01; 355/75; 399/213; 250/208.1, 234, 235, 236, 239; 382/312

[56] References Cited

U.S. PATENT DOCUMENTS

| | | | |
|---|---|---|---|
| 5,166,812 | 11/1992 | Dow et al. | 358/498 |
| 5,191,406 | 3/1993 | Brandestini et al. | 358/22 |
| 5,270,841 | 12/1993 | Watanabe | 358/496 |
| 5,463,256 | 10/1995 | Wang et al. | 271/274 |
| 5,663,812 | 9/1997 | Pan | 358/474 |
| 5,663,813 | 9/1997 | Pan | 358/474 |

*Primary Examiner*—Edward L. Coles, Sr.
*Assistant Examiner*—Kimberly A. Williams
*Attorney, Agent, or Firm*—David M. Woods

[57] ABSTRACT

A supporting arrangement for constraining unwanted motions of an original that is being supported for movement through a scanner includes a tray for transporting the original past an image scanning location and five datum surfaces for constraining motion. The tray includes two side rails and an elongated rib arranged underneath the tray generally parallel to the side rails. Three datum surfaces bear against the upper edges of the side rails, two of the datum surfaces positioned against one of the side rails and the other datum surface positioned against the other side rail so as to constrain unwanted motion of the tray in three degrees of motion, and a first force is then impressed against the bottom of the elongated rib. Two other datum surfaces bear against one side of the elongated rib so as to constrain unwanted motion of the tray in two additional degrees of motion, and a second force is then impressed against the other side of the elongated rib between the two datum surfaces. The tray is thereby allowed to move through the scanner without unwanted motions in other directions.

7 Claims, 9 Drawing Sheets

ARRANGEMENT FOR SUPPORTING A DRAWER IN A DRAWER FEED SCANNER

FIELD OF THE INVENTION

The invention relates generally to the field of scanning, and in particular to techniques for precisely constraining a platen that positions an original for scanning.

BACKGROUND OF THE INVENTION

In order to allow consumers to be able to easily use their photographic images, or other types of images, in computer documents, there is a need to provide customers with easy access to the equipment that is necessary to digitize these images. Typical consumers take photographic images with film loaded into a camera. They will process the film at a photo finisher and receive processed negatives and photographic prints in return. The negatives are very apt to being lost or misplaced, but the prints are usually stored where they can be accessed in the future, such as in an album or a shoebox. The photographic print sizes that typical customers receive are usually five inches by seven inches and smaller, down to a wallet size of one and a half inch by two and a quarter inch.

Currently there exists several types of scanners that allow consumers to digitize their photographic images, or other type of documents, into their computer applications. Each have their drawbacks. Flat bed scanners are bulky, expensive, and best suited for higher quality applications. Hand-held scanners are available, but suffer from poor scan control. Large and small format sheet-fed scanners are also available, but they are limited in the type and condition of media they can accept without potential damage to the media. Moreover, these scanners take up additional space on the desktop and for most home applications space is usually at a minimum.

With regard to the problem of space utilization, U.S. Pat. No. 5,191,406 describes a transparency scanner housed in a chassis having the same dimensions as a standard half-height 5¼" floppy disk drive. Thus the scanner can be mounted in a standard disk drive bay of a conventional personal computer. Each transparency is hand inserted into an opening on the input bezel of the scanner. A slide tray inside the scanner grips the transparency and transports the transparency past a scanning beam. While this scanner fits comfortably into an existing computer peripheral space, certain drawbacks remain. As mentioned earlier, transparencies, i.e., slides and negatives, are less likely to be the type of originals that a consumer has to work with. Moreover, the scanner is limited to originals meeting certain rigid size specifications. In addition, the original is gripped by machine driven components and therefore subject to damage. Furthermore, the internal slide tray that positions the original for scanning must meet exacting tolerances for scanning. This leads to additional costs.

The tray that guides the original, e.g., the slide tray in the aforementioned '406 patent, past the scanning beam should be precisely constrained in all degrees of orientation except the one degree that is the scan direction. In particular, there should be no undesirable motions in any of the degrees of orientation that are fully constrained. This ordinarily results in many parts. In addition, if the tray must assume a cantilevered position during any part of its travel, the forces producing constraint can easily cause binding of the movable parts, particularly if the mechanical components are overly or incorrectly constrained. The need therefore is for a simple reflection scanner that minimizes expensive components while still providing the stability necessary to obtain a smooth scanning motion for a variety of different sized originals.

SUMMARY OF THE INVENTION

The aforementioned need is realized according to the invention by a supporting arrangement for constraining unwanted motions of an original that is being supported for movement through a scanner. The supporting arrangement includes:

(a) a tray for transporting the original past an image scanning location, the tray including an elongated section arranged underneath the tray generally in the direction of the movement of the tray through the scanner;

(b) a first set of three datum surfaces bearing against the tray so as to constrain unwanted motion of the tray in three degrees of motion;

(c) means for impressing a first force against the elongated section from a side opposite to the first set of three datum surfaces;

(d) a second set of two datum surfaces bearing against one side of the elongated section so as to constrain unwanted motion of the tray in two additional degrees of motion; and (e) means for impressing a second force against the other side of the elongated section between the two datum surfaces comprising the second set, whereby the tray is allowed to move in a scanning direction through the scanner without unwanted motions in other directions.

The supporting arrangement according to this invention has many advantages over the prior technology. The way of supporting the drawer leads to a small size that allows the scanning device to be conveniently located inside a computer. This is convenient for a consumer because it will use less desk space than if the scanner was a separate unit. Another advantage of this supporting arrangement is that there are no additional components that will contact the drawer during the scanning process, such as multiple drawer slides that are widely used to gain maximum opening of drawers. A further advantage is that this invention allows the fewest number of parts and a low cost solution, all the while obtaining consistent movement of the drawer in the scan direction without undesirable motions, or binding, in any of the other orientations.

These and other aspects, objects, features and advantages of the present invention will be more clearly understood and appreciated from a review of the following detailed description of the preferred embodiments and appended claims, and by reference to the accompanying drawings.

3

Figure 5:
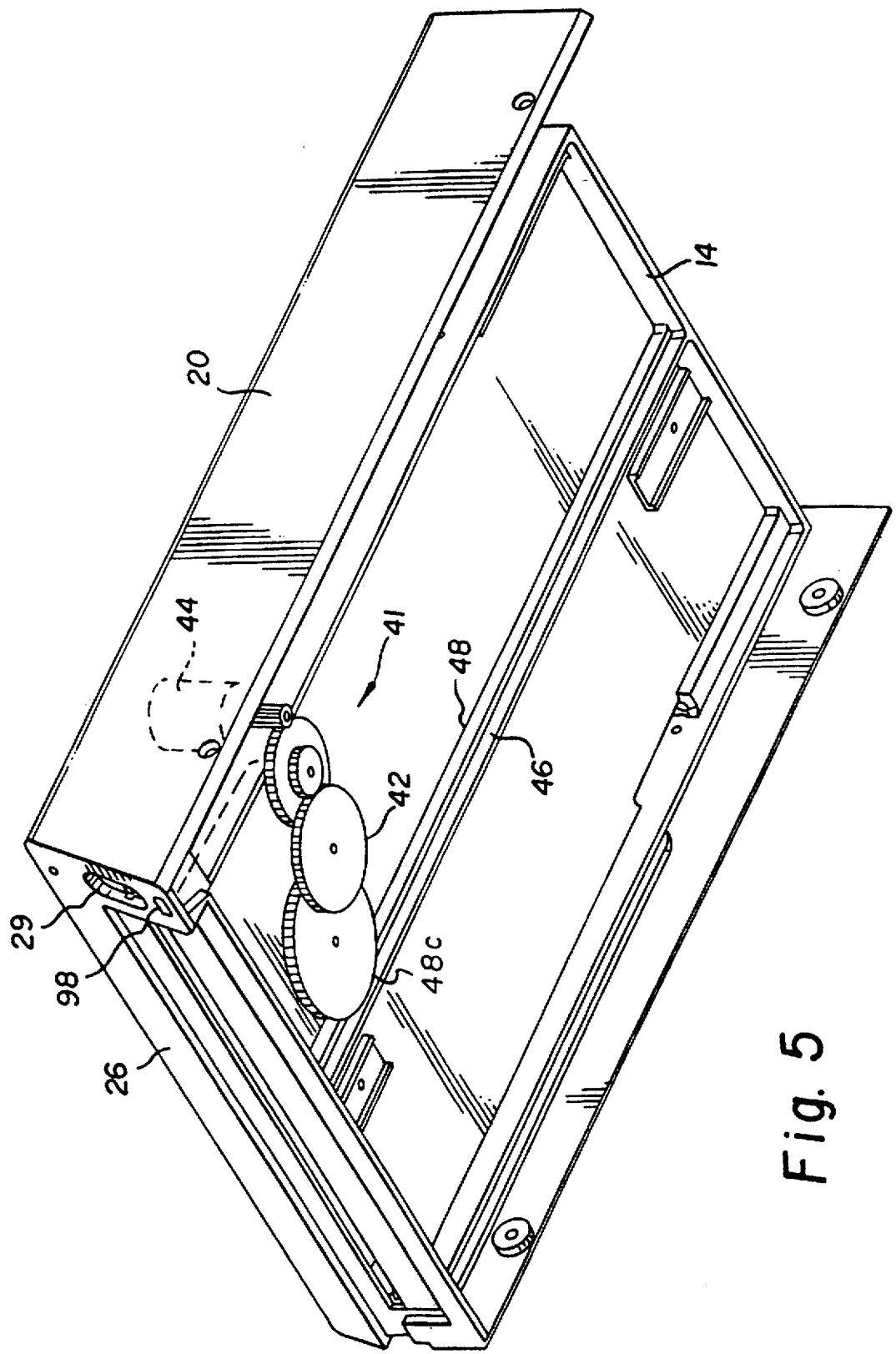
FIG. 5 is a perspective view of the scanner shown in FIG. 2 with the lower casing removed and the drawer fully inserted into the scanner to show the drive mechanism for the scanner.
Figure 6:
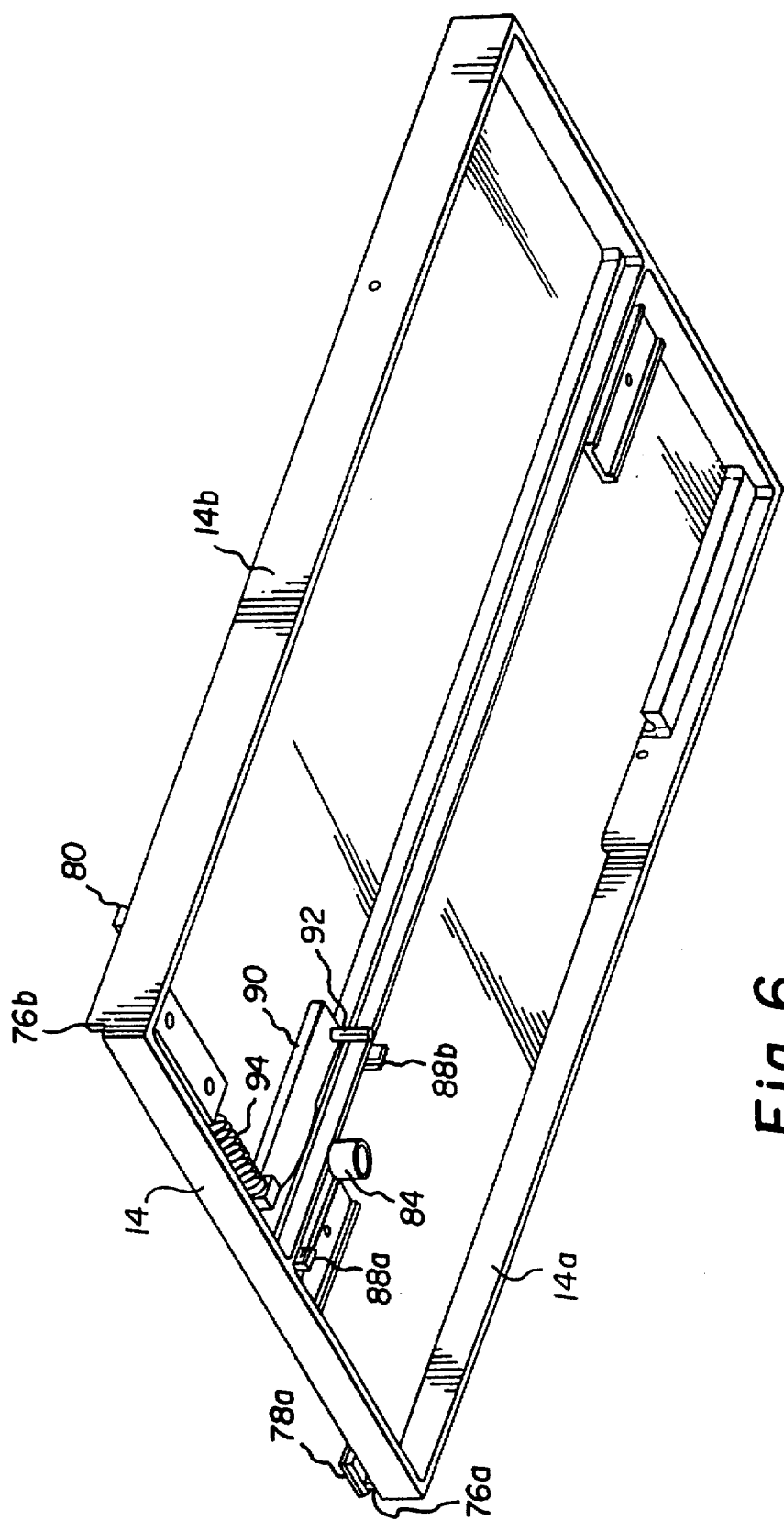
Figure 7:
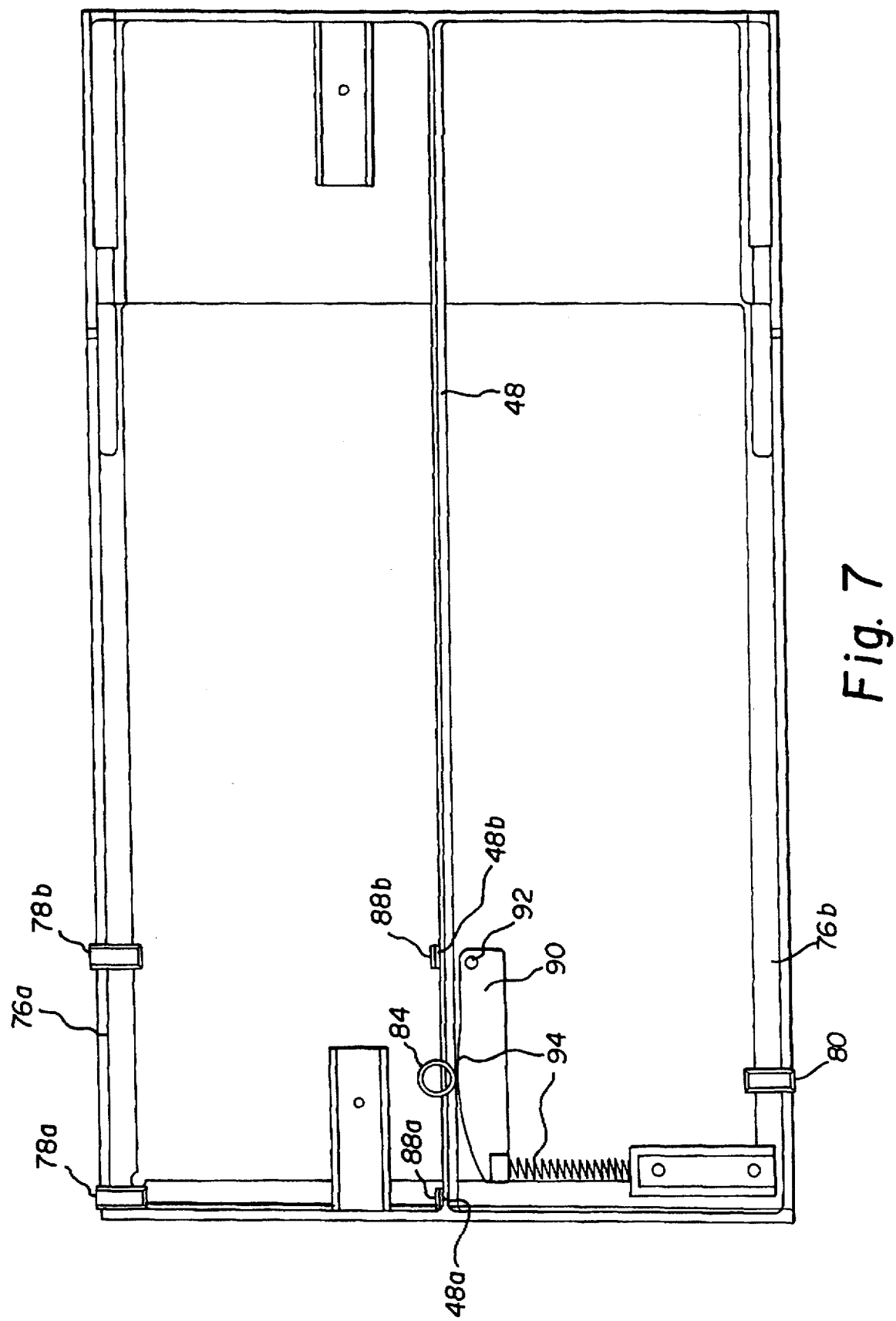
Figure 8:
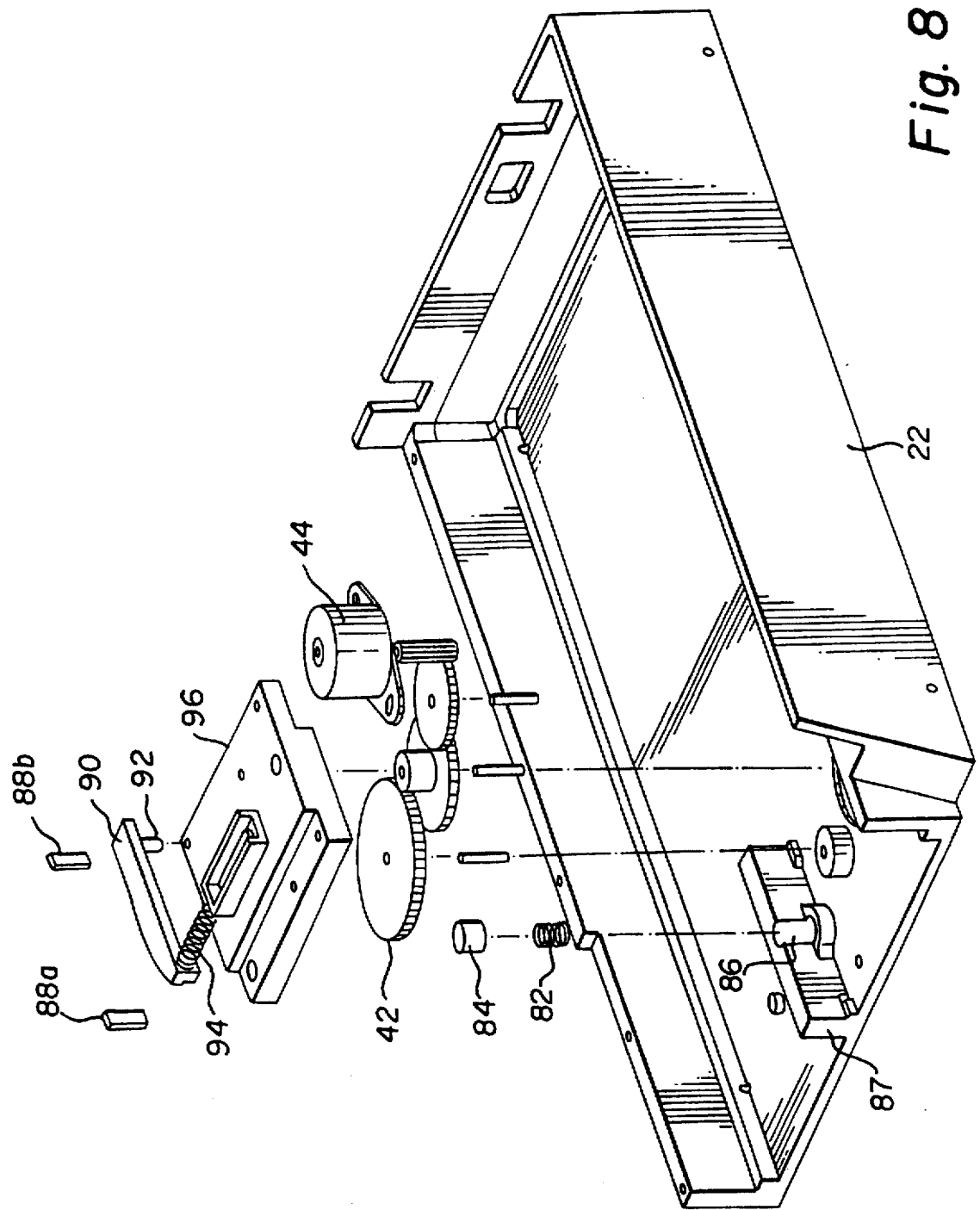
Figure 9:
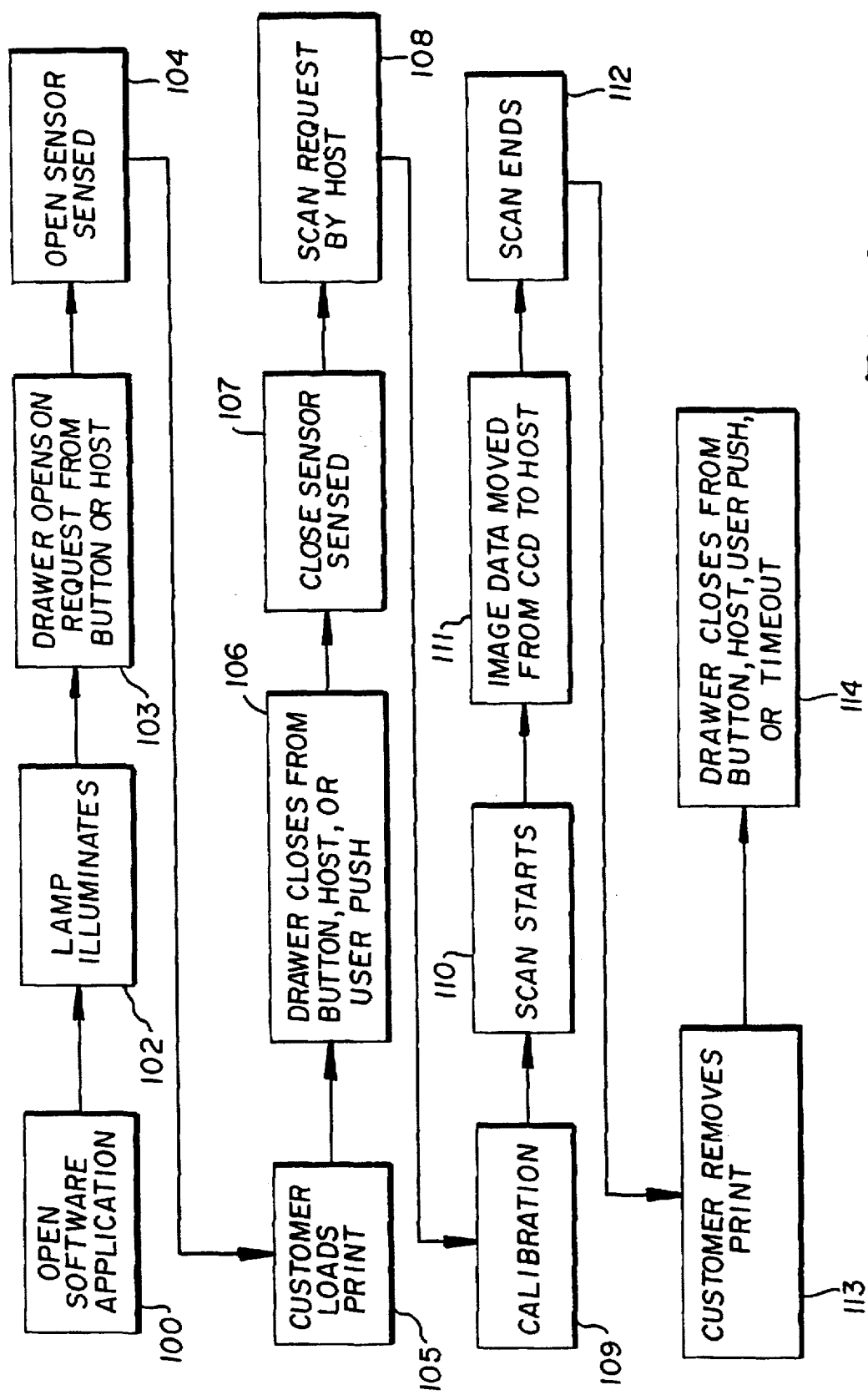

FIG. 6 is a perspective view of the drawer from underneath showing elements of the arrangement for supporting the drawer according to the invention;

FIG. 7 is a plan view of the supporting arrangement for the drawer taken from the underside of FIG. 6;

FIG. 8 is an exploded view of the lower casing of the scanner showing the supporting elements of FIGS. 6 and 7 and the gear train from FIG. 5; and FIG. 9 is a process flow diagram showing the operation of the scanner according to the invention.

DETAILED DESCRIPTION OF THE INVENTION

Figure 1:
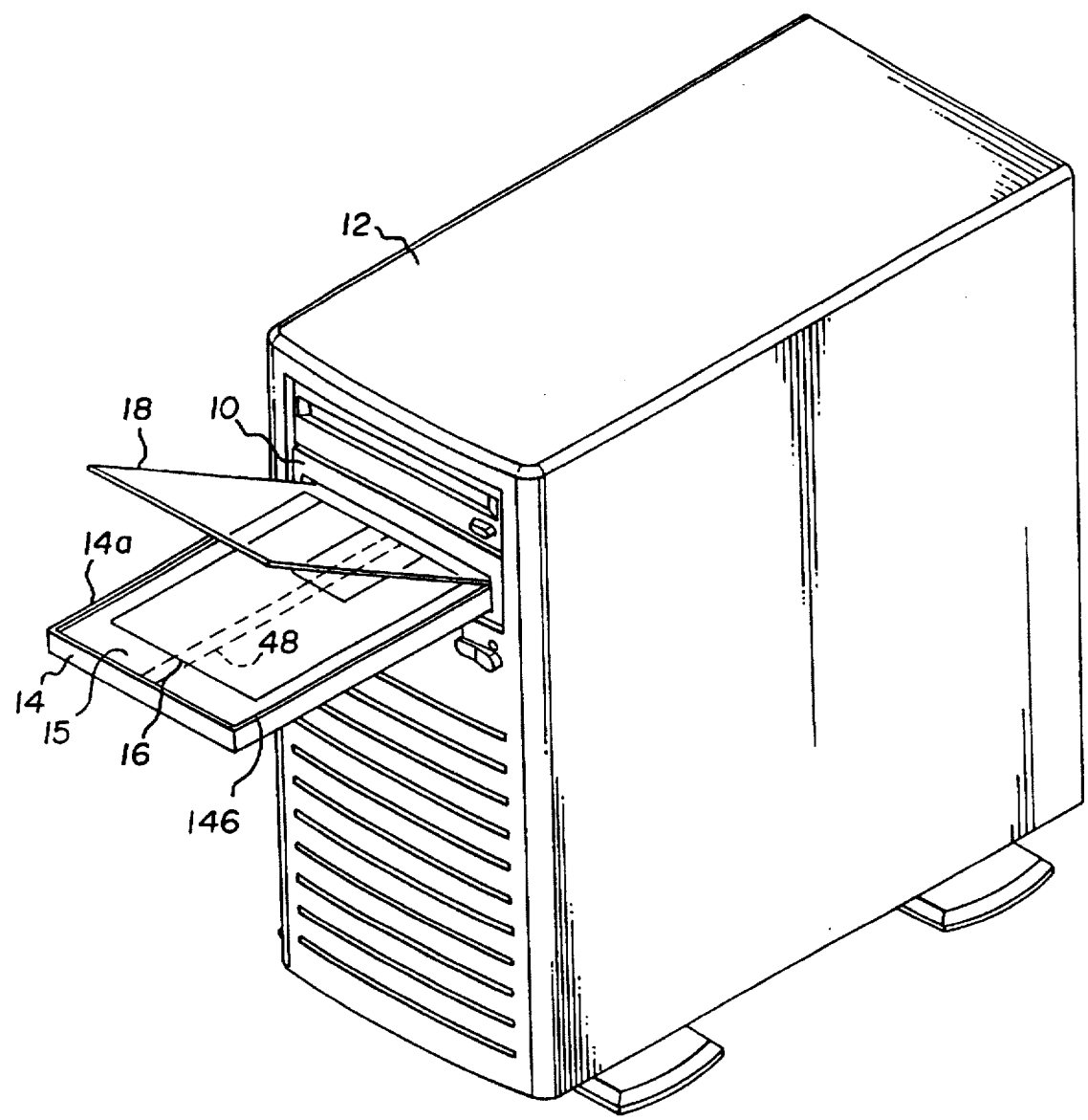
FIG. 1 is a perspective view of a scanner mounted in a drive bay of a computer showing an extendible drawer and its raised lid according to the invention.

The preferred embodiment of a scanner utilizing the supporting arrangement according to the invention comes in two versions: one version for mounting in a drive bay of a computer and the other version for use as a desk top unit. Both operate in conjunction with a host processor. Referring first to FIG. 1, a scanner 10 is shown mounted into a conventional half height, drive bay 12 of the type used with a desktop computer or workstation (not shown). The scanner 10 includes an extendible tray, shown as a drawer 14, which is used for loading and positioning an original 16 prior to scanning. The drawer includes side rails 14a and 14b and a scanning platen 15. In addition, an elongated center rib 48 is located underneath the platen 15 generally parallel to the side rails 14a and 14b. (The center rib 48 is shown in broken line in FIG. 1 and in full view in FIGS. 5, 6, and 7.)

As will be shown and described, the drawer 14 is also used to accurately guide the original 16 through an image scanning location in the scanner 10. The drawer 14 may be manually released and/or closed or its movement may be automated through a command from the host computer. A clear lid 18 is manually lifted about a pivot 19 (shown in FIG. 3) when the drawer 14 is extended from the bay 12, and the original is then placed upon the scanning platen 15. The lid 18 is then closed against the platen 15 during the scanning sequence. The lid 18 is of sufficient optical quality to allow scanning through the lid material.

Figure 2:
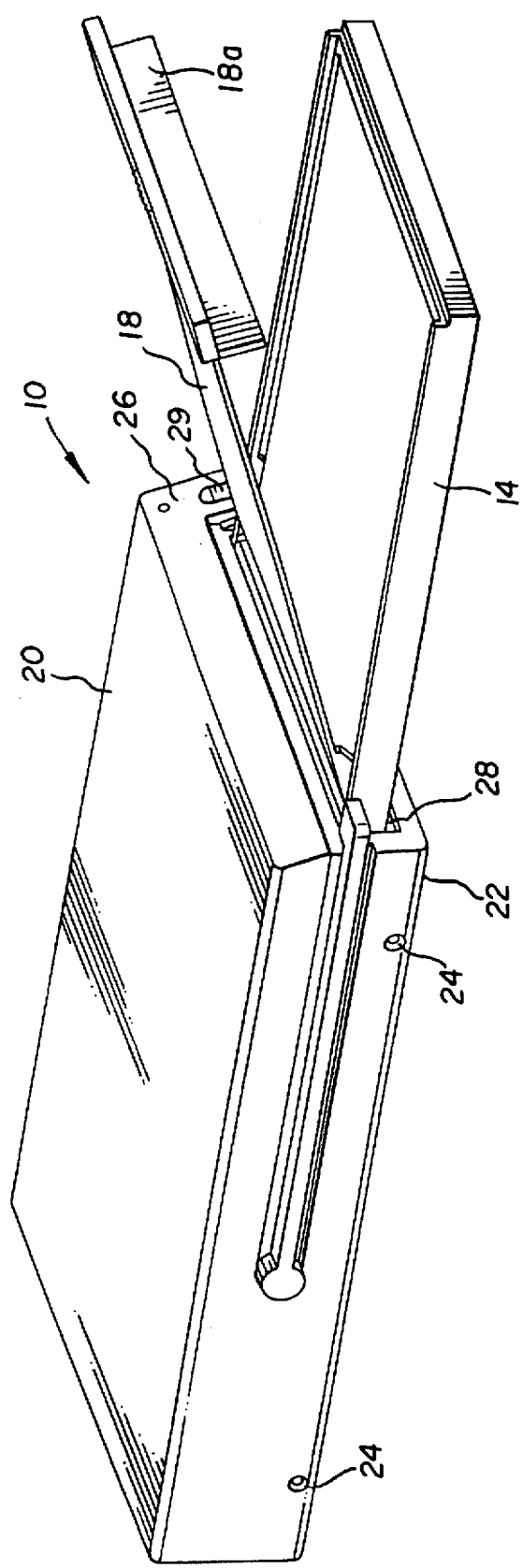
FIG. 2 is a perspective view of a desk top version of the scanner shown in FIG. 1.

In FIG. 2, the scanner 10 is shown in its desk-top version including an enclosure comprising an upper casing 20 fastened into a lower casing 22 (also shown in FIG. 8) at fastener locations 24. The upper casing 20 includes a front bezel 26 and an opening slot 28 for the drawer 14. The lid 18 further includes a handle 18a, which forms part of the ornamental appearance of the front bezel 26 when the drawer 14 is fully inserted into the scanner 10. For either version, scanning is initiated from the host computer.

Figure 3:
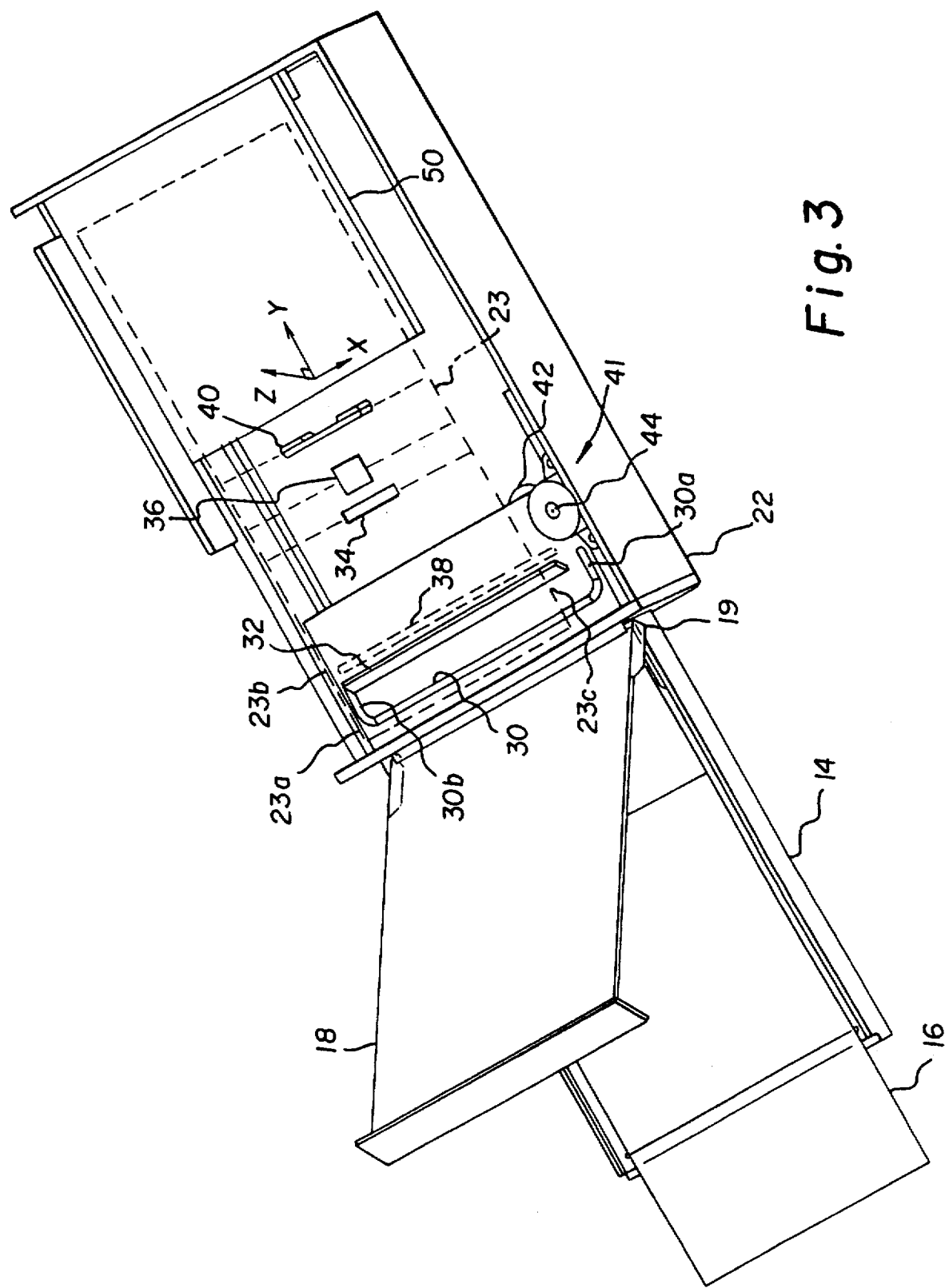
FIG. 3 is a perspective view of the bay-mounted scanner shown in FIG. 1 with the drawer partially extended from the scanner.
Figure 4:
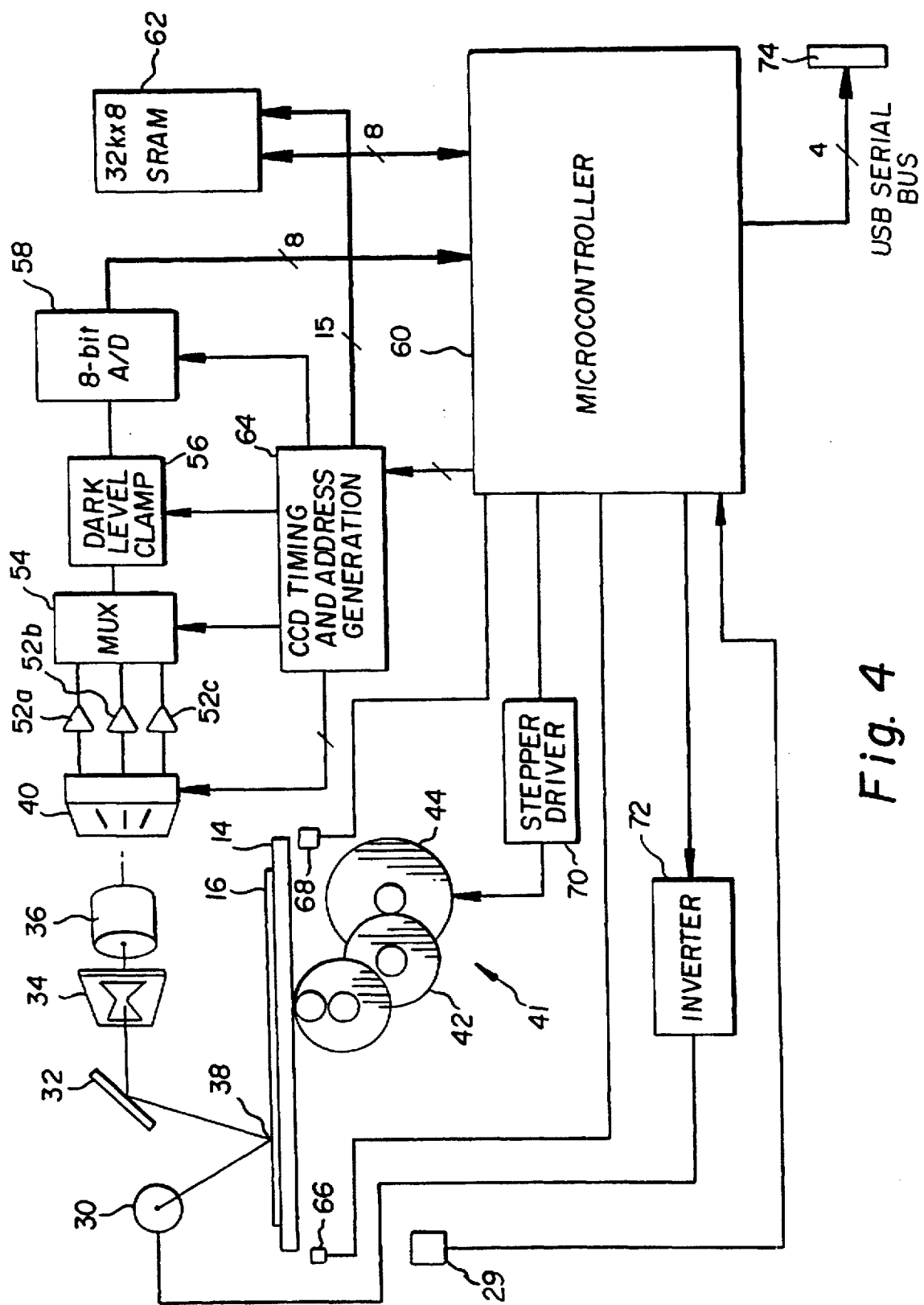
FIG. 4 is a block diagram showing the scanning system and associated electronics.

The components of the scanning mechanism used in the scanner 10 are the same in both versions. In FIG. 3 the scanner 10 exposes the components from the top. In FIG. 5, the view is taken from the bottom of the upper casing to mainly show the drive mechanism. FIG. 4 shows the same internal components in relation to a block diagram of the signal processing and control system. Referring first to FIG. 3, the scanning mechanism includes a set of optical components including a lamp 30, a mirror 32, an aperture 34, a lens 36 and an imaging device 40. These optical components are mounted on an optical frame component 23, which is shown in broken lines to indicate that it may take different configurations depending on the shape, size, and location of the optical components. The optical frame component 23 is attached to the lower casing 22, on which a scanning drive mechanism 41 is mounted.

The lamp 30, which is shown as a cold cathode fluorescent lamp with corner extensions 30a and 30b, provides even illumination of a linear image scan location 38 extending across the face of the original 16. As shown in FIG. 4, the best illumination position of the lamp is arranged at 45° with respect to the image scan location 38 so that an image scanning beam reflected from the original 16 is directed by the mirror 32 through the aperture 34 and the lens 36 upon the imaging device 40. The aperture 34 has a "bow-tie" opening that corrects for light falloff toward the edges of the image scanning beam. The imaging device is a tri-linear array charge-coupled device (CCD), with one array for each of red, green, and blue (RGB) colors.

The original 16 is positioned on the drawer 14 beneath the lid 18 with respect to reference marks (not shown). A button 29 (shown in FIG. 5) on the front bezel 26 activates the scanning drive mechanism 41 to open and close the drawer 14 (the drive mechanism 41 can also be actuated from the host computer). Once the drawer 14 has been closed with the original 16 in position under the lid 18, the scanning sequence is activated from the host computer. The scanning drive mechanism 41 includes a gear train 42 interconnecting a stepper motor 44 and a linear rack gear 46 formed on the bottom surface of the center rib 48 on the underside of the drawer 14. Scanning occurs as the drawer 14 is driven out of the scanner 10 by engagement of the gear train 42 and the rack 48. The stepper motor 44 is regulated to provide the required scan speed as the drawer 14 transports the original 16 past the illuminated image scan location 38 toward the front end of the scanner. During the scanning stage, the drawer 14 moves outward from the front of the scanner 10, and, if the scanner 10 is bay-mounted, outward from the drive bay 12.

FIGS. 6, 7, and 8 show, according to the invention, elements of the drawer constraint, which is important in ensuring that the motion of the drawer can be held to the high tolerances necessary for precision scanning. In particular, the drawer 14 must be constrained against unwanted movement, linear or rotational, in five degrees of motion with respect to the X, Z, theta X, theta Y and theta Z coordinates shown in FIG. 3. The Y coordinate is not constrained, as this is the motion of the drawer opening and closing, as well as scanning. FIG. 6 shows the positions of the constraining elements in relation to the drawer, particularly from its underside, while FIG. 7 shows the same elements in plan view. FIG. 8 shows how some of the constraining elements are fastened into the lower casing 22 (the others being fastened into the optical frame component 23).

A first set of three datum surfaces are located, generally at points 23a, b, and c on the underside of the optical frame component 23 that mounts the imaging device 40, lens 36, mirror 32, and the lamp 30, as viewed in FIG. 3. These datum surfaces bear against the drawer 14 and act as the locating features that provide exact constraint for the drawer 14 in the Z, theta X and theta Y directions, according to FIG. 3, in order to keep the drawer surface in the image plane of the optical components. The side rails 14a and 14b of the drawer 14 are loaded against the three datum surfaces by a load that is applied to the bottom of the center rib 48, and which is centrally located on the drawer between the three datum surfaces. This load needs to be high enough to support the drawer 14 against all three surfaces throughout the full travel of the drawer in both directions. The loading of the drawer against these three datum surfaces constrains the drawer in the Z direction, and prevents rotation about the X and Y axis, as shown in FIG. 3, thereby providing exact constraint in three degrees of motion.

With regard to the preferred embodiment, as shown in FIG. 6, the drawer 14 is supported and constrained at the upper edges 76a and 76b of the rails 14a and 14b, respectively, and about the center rib 48 allowing it to be easily driven out of the drive bay 12 in the scan direction. The aforementioned first set of three datum surfaces include two left drawer support pads 78a,b and a right drawer support pad 80, which are arranged in the optical frame component 23 so that they form contacting surfaces for the upper edges 76a and 76b, respectively. The drawer 14 is loaded from the bottom of the center rib 48 by a spring 82 located in the hollow of a plunger 84 that fits into a pocket 86 in a housing 87 in the lower casing 22. This causes the loading of the drawer f4 against the drawer support pads 78a,b and 80 on either side of the drawer 14 so as to constrain the drawer in the Z direction and to prevent rotation about the theta X and Y axes.

A second set of two datum surfaces are located on the lower housing 22 that mounts the optical frame component 23, the motor 44, and the gear train 42, as viewed in FIG. 3. These datum pad surfaces are generally located at points 48a and 48b as shown in FIG. 7, and are the locating features for the drawer 14 in the X and theta Z directions according to FIG. 3. The drawer 14 is loaded against the two datum surfaces by a load that is applied to the opposite side of the center rib 48 on the drawer 14. The load is centrally located between the two datum pad surfaces, and should be high enough to always support the drawer against both datum surfaces throughout the full travel of the drawer in both directions. The loading of the drawer against these two datum surfaces constrains the drawer in the X direction and prevents rotation about the Z axis, thereby providing exact constraint in two degrees of motion.

Referring again to the preferred embodiment as shown in FIG. 6, the drawer 14 is constrained in the X direction and against theta Z rotation by loading one side of the center rib 48 against a pair of rib support pads 88a,b, which provide the aforementioned second set of two datum pad surfaces that are supported on the lower casing 22. This central loading is provided by a rocker 90 pivoted around a post 92 by a spring 94 against the center rib 48. The spring 94 and the post 92 are anchored in a gear cover 96, which mounts the gear train 42 and the motor 44 against the lower casing 22. The stepper motor 44 provides sufficient torque to overcome the loads applied to the drawer 14 and to drive the drawer 14 in the Y direction, which is not otherwise constrained. The driving mechanism 41 imparts motion to the rack 46 at a point 48c (as shown in FIG. 5), which is between the second set of datum surfaces located at points 48a and 48b.

The drawer is thus free to move in only one orientation that is also the scan direction or the Y direction, as shown in FIG. 3. The objective of this arrangement is to gain maximum drawer extension with minimal support so that the overall length of the drawer is kept at a minimum. The advantage of this supporting arrangement is that there are no additional components that will contact the drawer during the scanning process, such as multiple drawer slides that are widely used to gain maximum opening of drawers. Loading the drawer sideways at the center rib 48 instead of at one of the sides of the drawer allows the drawer to be easily pushed in manually from a location anywhere along the front of the drawer. If the loading was at the side of the drawer, and the drawer was being manually closed from the opposite front corner, the drawer would easily bind because of the angle through which the force was applied to the friction areas.

While the five contacting restraints active at points 23a, 23b, 23c, 48a and 48b are shown as pads, any of these contacts could be implemented through use of other types of contact members, such as rollers or balls. Likewise, the two biasing forces represented by the spring loads from the spring 82 and the rocker 90 could have roller or ball contact, rather than the frictional sliding contact with the rib 48.

The signal processing and control elements shown in FIG. 4 are mounted on a data processing board 50 (shown in FIG. 3) mounted to the optical frame component 23. The tri-linear array image sensor 40 produces a scanning signal comprising separate R,G,B analog output signals corresponding to red, green, and blue linear scans of the original. These signals are applied in tandem to three emitter follower buffers 52a,b,c and then combined into a single signal path by a multiplexer 54. The multiplexed signal is clamped in a dark level clamp 56 and converted into a digital signal by an A/D converter 58. The digital image signal is applied to a microcontroller block 60 and stored in a buffer memory 62. A CCD timing and address generator 64 controls the generation of drive signals for the imaging device 40 and the timing of the subsequent signal processing chain.

The position of the drawer 14 is monitored by a drawer open sensor 66 and a drawer closed sensor 68, both connected to the microcontroller block 60. The operator enabled button 29 applies a signal to the microcontroller block 60 that initiates a drive sequence, either extending the drawer 14 from the scanner 10 if the drawer is initially closed or drawing the drawer 14 into the scanner 10 if the drawer is initially open. When a scanning sequence is to commence, the microcontroller block 60 instructs a stepper driver 70 to enable the stepper motor 44, thereby driving the drawer 14 out of the scanner 10 past the image scan location. Meanwhile the microcontroller block 60 couples a power inverter 72 to the lamp 30, which illuminates the image scan location 38. After the scanning has begun, the microcontroller block 60 transfers the digital scanning signal to the host computer through a communication interface 74, in this case a USB serial bus. The microcontroller block 60 also receives instructions, such as to initiate a scan, from the host computer through the communication interface 74. Although not shown in FIG. 4, power is also supplied from the host computer.

Because the operator can hand insert an original into the drawer 14 under the lid 18, and there is no further contact between the original and the scanner during the scanning sequence, the preferred embodiment eliminates any potential for damage to the original. The lid 18 also serves to flatten any original material that may have curl, besides functioning as a protective device for the original 16 and helping to prevent external debris from contaminating the internal components of the scanner 10. The clear window of the lid 18 will be approximately the same size as the largest print accepted into the drawer 14. A particular advantage of the drawer-lid arrangement is that, if there are any defects on the lid window, the defect will appear on the scanned image as a spot relatively equal to the proportion of the size of the spot compared to the original. If the scan window only covered a smaller area within close proximity to the scan area, such as the way most hand held and sheet fed scanners are currently configured, the defect would appear as a line across the entire scanned image and would be much more objectionable to the consumer. In addition, the scanner (shown in FIG. 5) provides manual access at any time, if necessary via a mechanical drawer release, such as a recessed gear release 98 that can be operated by a tool or pin.

The operating process of the scanner is shown in the flow diagram of FIG. 9. The software application is opened on the host computer at step 100. At this time (step 102), the lamp 30 is illuminated. In step 103, the drawer 14 opens either on request from the host computer, through the software application, or by actuation of the button 29 on the front bezel 26. The drive mechanism 41 then drives the drawer open until the drawer open sensor 66 signals the microcontroller block 60 that the drawer is open (step 104). At step 105, the customer loads an original, e.g., a photographic print, onto the drawer 14 under the lid 18. The drawer 14 is then closed (step 106) by either actuating the button 29, entering an instruction through the host computer, or (after releasing the drive mechanism) by manually pushing the drawer into the scanner. The drawer closed sensor 68 senses closure (step 107), and the scanning sequence is initiated from the host computer (step 108).

Initially, a calibration step 109 may be completed by, e.g., the scanning of a white strip (not shown) on the front of the drawer 14. After calibration, the scanning sequence is commenced by controllably moving the drawer out of the scanner (step 110) and image data is moved from the imaging device 40 through the signal processing chain to the host computer (step 111). After the scan ends (step 112) the drawer 14 is fully extended and the customer lifts the lid 18 to remove the original (step 113). The drawer 14 is then retracted into the scanner, either by actuation of the button 29, by instruction from the host computer, by a user push, or by timeout after a predetermined time (step 114).

In summary, this concept allows the fewest number of parts and a low cost solution to obtain consistent movement of the drawer in the scan direction without undesirable motions in any of the other orientations. The datum surfaces that accurately locate the drawer also keep the drawer aligned to the optical path within the optical frame assembly of components. The optical frame component is mounted to the lower housing that also provides the secondary datums for the drawer. This concept of locating and loading of the drawer provides the sufficient stability necessary to obtain a smooth scanning motion.

The invention has been described with reference to a preferred embodiment. However, it will be appreciated that variations and modifications can be effected by a person of ordinary skill in the art without departing from the scope of the invention. For example, instead of occurring when the drawer 14 is opened, scanning can occur when the drawer 14 is drawn into the scanner 10.

Additionally, the force provides the load against the drawer support pads 78a, 78b, and 80, although shown as applied to the center rib 48 by a spring 82, could be applied elsewhere on the underside of the drawer 14. Furthermore, in order to support the drawer 14 when it is fully extended, it may be desirable that the right drawer support pad 80 acting at the point 23c on the upper edge 76b be elongated, or be two separated pads. In this way, the drawer 14 is supported on both upper edges 76a and 76b over an extended distance, which may help to distribute the support forces when the drawer 14 is fully extended from the scanner.

PARTS LIST

| | |
|---|---|
| 10 | scanner |
| 12 | drive bay |
| 14 | drawer |
| 14a | side rail |
| 14b | side rail |
| 15 | platen |
| 16 | original |
| 18 | lid |
| 18a | handle |
| 19 | pivot |
| 20 | upper casing |
| 22 | lower casing |
| 23 | optical frame component |
| 23a,b,c | points |
| 24 | fastener locations |
| 26 | front bezel |
| 28 | opening slot |
| 29 | button |
| 30 | lamp |
| 30a,b | corner extensions |
| 32 | mirror |
| 34 | aperture |
| 36 | lens |
| 38 | image scan location |
| 40 | imaging device |
| 41 | scanning drive mechanism |
| 42 | gear train |
| 44 | stepper motor |
| 46 | linear rack |
| 48 | center rib |
| 48a,b,c | points |
| 50 | data processing board |
| 52a,b,c | emitter follower buffers |
| 54 | multiplexer |
| 56 | dark level clamp |
| 58 | A/D converter |
| 60 | microcontroller block |
| 62 | memory |
| 64 | CCD timing and address generator |
| 66 | drawer open sensor |
| 68 | drawer closed sensor |
| 70 | stepper driver |
| 72 | power inverter |
| 74 | communication interface |
| 76a,b | upper edges |
| 78a,b | left drawer support pads |
| 80 | right drawer support pad |
| 82 | spring |
| 84 | plunger |
| 86 | pocket |
| 87 | housing |
| 88a,b | rib support pads |
| 90 | rocker |
| 92 | post |
| 94 | spring |
| 96 | gear cover |
| 98 | gear release |

We claim:

1. A supporting arrangement for constraining unwanted motions of an original that is being supported for movement through a scanner, said supporting arrangement comprising:

a tray for transporting the original past an image scanning location, said tray including an elongated section arranged underneath the tray generally in the direction of the movement of the tray through the scanner;

a first set of three datum surfaces bearing against the tray so as to constrain unwanted motion of the tray in three degrees of motion;

means for impressing a first force from a side opposite to the first set of three datum surfaces;

a second set of two datum surfaces bearing against one side of the elongated section so as to constrain unwanted motion of the tray in two additional degrees of motion; and means for impressing a second force against the other side of the elongated section between the two datum surfaces comprising the second set, whereby the tray is allowed to move in a scanning direction through the scanner without unwanted motions in other directions.

2. A supporting arrangement as claimed in claim 1 wherein the elongated section is an elongated rib, said supporting arrangement further comprising a drive mechanism that exerts a driving force on said other side of the elongated rib between the two datum surfaces comprising the second set, said driving force providing movement of the tray through the scanner in the scanning direction.

3. A supporting arrangement as claimed in claim 2 wherein the datum surfaces are pads that bear against the tray and rib while permitting sliding motion of the tray and rib in the scanning direction against the datum surfaces.

4. A supporting arrangement for constraining unwanted motions of an original that is being supported for movement through a scanner, said supporting arrangement comprising:

a tray for transporting the original past an image scanning location, said tray including two side rails oriented lengthwise in the direction of motion through the scanner and an elongated rib arranged underneath the tray generally parallel to the side rails;

a first set of three datum surfaces bearing against the upper surfaces of the side rails, two of the datum surfaces positioned against one of the side rails and the other datum surface positioned against the other side rail so as to constrain unwanted motion of the tray in three degrees of motion;

means for impressing a first force against the elongated rib from a side opposite to the first set of three datum surfaces;

a second set of two datum surfaces bearing against one side of the elongated rib so as to constrain unwanted motion of the tray in two additional degrees of motion; and means for impressing a second force against the other side of the elongated rib between the two datum surfaces comprising the second set, whereby the tray is allowed to move in a scanning direction through the scanner without unwanted motions in other directions.

5. A supporting arrangement as claimed in claim 4 further comprising a drive mechanism that exerts a driving force on said other side of the elongated rib between the two datum surfaces comprising the second set, said driving force providing movement of the tray through the scanner in the scanning direction.

6. A supporting arrangement as claimed in claim 5 wherein the datum surfaces are pads that bear against the side rails and rib while permitting sliding motion of the side rails and rib in the scanning direction against the datum surfaces.

7. A supporting arrangement as claimed in claim 4 wherein the rib is centrally located between the side rails.

* * * * *